(No Model.)
V. C. A. M. BONDONNEAU.
APPARATUS FOR THE SACCHARIFICATION OF AMYLACEOUS MATTER.
No. 457,104. Patented Aug. 4, 1891.
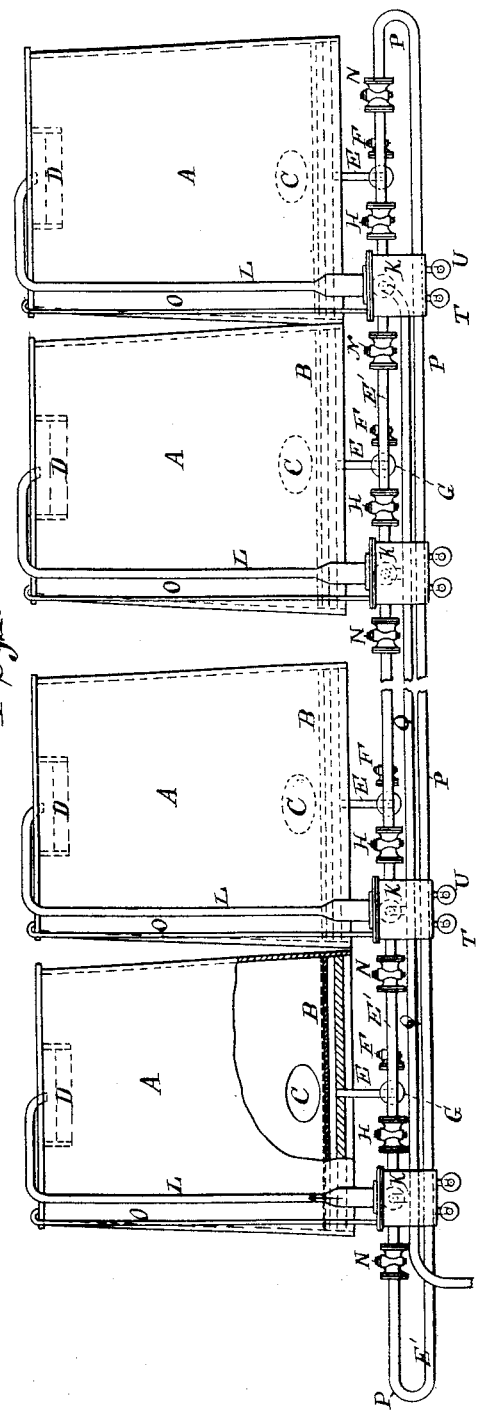
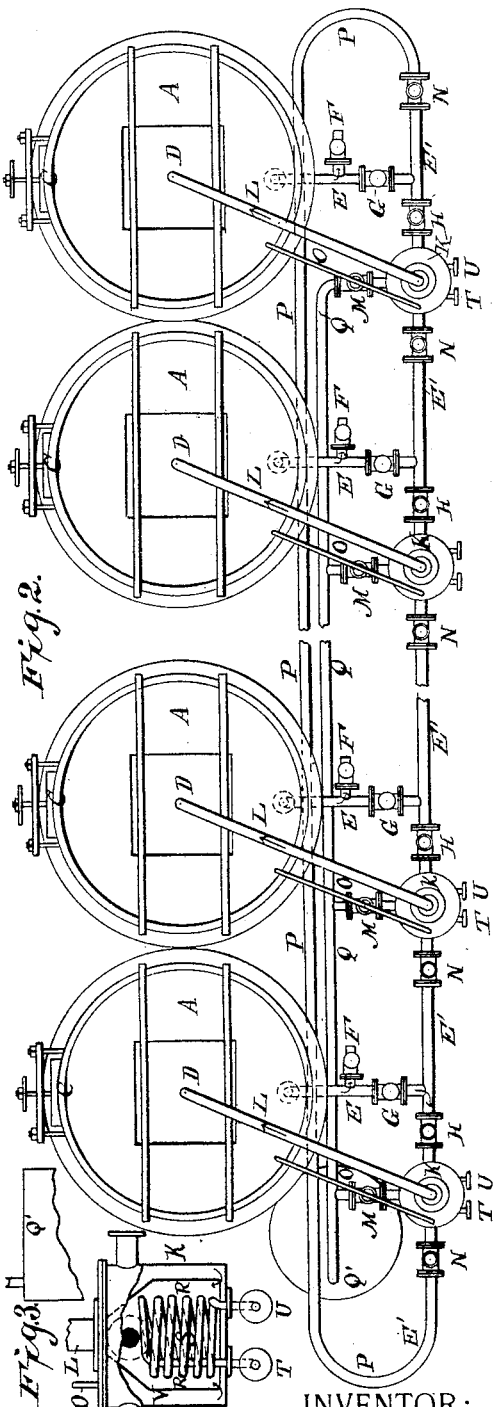
WITNESSES:
INVENTOR:
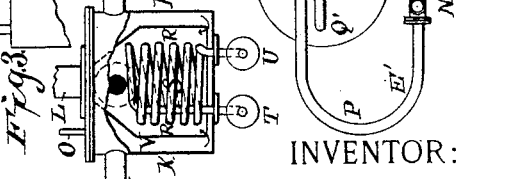

UNITED STATES PATENT OFFICE.

VICTOR CAMILLE AUGUSTE MARCEL BONDONNEAU, OF PARIS, FRANCE.

APPARATUS FOR THE SACCHARIFICATION OF AMYLACEOUS MATTER.

SPECIFICATION forming part of Letters Patent No. 457,104, dated August 4, 1891.

Original application filed April 4, 1888, Serial No. 269,527. Divided and this application filed June 7, 1889. Serial No. 313,469. (No model.) Patented in France February 25, 1886, No. 178,728, and March 17, 1886, No. 174,830; in Belgium February 25, 1886, No. 74,637; in England January 21, 1887, No. 986; in Italy January 27, 1887, XX, 21,167, and XLII, 333; in Germany March 3, 1887, No. 42,519, and in Spain March 4, 1887, No. 10,513.

*To all whom it may concern:*

Be it known that I, VICTOR CAMILLE AUGUSTE MARCEL BONDONNEAU, a citizen of the French Republic, residing in Paris, France, have invented certain new and useful Improvements in Apparatus for the Saccharification of Amylaceous Matter, of which the following is a specification.

This invention was patented in France March 17, 1886, No. 174,830, and February 25, 1886, No. 178,728; in Belgium February 25, 1886, No. 74,637; in England January 21, 1887, No. 986; in Germany March 3, 1887, No. 42,519; in Italy January 27, 1887, Nos. XX, 21,167, and XLII, 333, and in Spain March 4, 1887, No. C. A. 10,513.

This invention relates to apparatus for the saccharification of amylaceous isomeric matters contained in vegetables by means of acids and the extraction by diffusion of the soluble principles, in order to produce on the one hand clean brewers' grains or pulp suitable for feeding to live stock and on the other hand sirups for use in the manufacture of glucose and in distilleries.

The saccharification by acids of grain, roots, and, in general, of all amylaceous vegetables, as it is now commonly effected, presents great difficulty by reason of the enormous quantity of deposit formed by the divided and torn cellulose membranes, which after filtration cannot serve as food for live stock and are only useful as manure, which has much less value. It would hence be very valuable to have a means of saccharification by acids, permitting of collecting on the one hand all the amylaceous matter and on the other hand the pulp in a merchantable condition for use as feed and having at least the same value as that obtained in the saccharification of malt.

In my study of the direct saccharification of amylaceous matters I have demonstrated that in certain conditions and under the influence of acids these substances can in the vegetable-cells which inclose them be entirely saccharified and reduced to soluble starch, dextrine, and glucose without rupturing the cells, thereby transforming by this chemical action a cell of insoluble amylaceous matter (starch) into a cell containing no more than the entirely soluble and easily-diffusible saccharine principles, (dextrines and glucose.) It hence results that all of the vegetable-cells being under the same conditions, the entire mass is not modified, and the grain or root, although containing no longer any starch, will have preserved its original form. The elimination of the new soluble principles (dextrines and glucose) is then effected by diffusion through the same channels which had led the principles immediately necessary to the constitution of the amylaceous matter in the vegetable. This saccharification requires the utmost precautions. In effect the grains which are of considerable hardness become by the elimination of the amylaceous matter as much more sensitive to bruising as the original grains are more rich in starch, the least bruising leading to the division and disaggregation of the cells, transforming the pulp into a paste which can no longer be submitted to diffusion. It is hence indispensable that this saccharification and diffusion shall be effected without submitting the vegetable mass to movement, but permitting the waters of saccharification and diffusion to surround it and penetrate it completely, the least possible quantity of water being employed. My present invention provides a new apparatus especially adapted to that end. The apparatus for saccharification and diffusion involves an ordinary leaching apparatus, the false bottom of which is provided with a wire-gauze covering. This apparatus, which may be called the "diffusion-saccharificator," being charged with the quantity of vegetable substance to be saccharified and with acidulated water, steam is introduced into the serpentine, whereby the liquid is boiled and a regular ascending and circulating movement is imparted to it. When the proof of the sirup produced indicates that saccharification has reached the desired stage, the steam is shut off and the apparatus is emptied, after washing with boiling water, in order to obtain the whole of the sirup. In the case of several apparatus connected to form a battery the preceding saccharificator is put in communication with the following one by a monte-jus or a pump, drawing the sirup from the bottom of the first in order to deliver it to the upper part of the second, and thus through the series. In order to facilitate the diffusion from one saccharificator to the following by shunting pumps, monte-jus, &c., I add to the diffusion-saccharificator a heating-elevator.

In the accompanying drawings, Figure 1 is an elevation, partly in vertical section, of a series of diffusion-saccharificators connected with heating-elevators and pipes to form a battery, the intermediate portion of the series being broken out. Fig. 2 is a plan thereof. Fig. 3 is an elevation of one of the heating-elevators, partly in vertical mid-section.

Let A A designate the diffusion-saccharificators, and K K the heating-elevators, E E', P and Q, P', Q' and L being the respective pipes connecting them. Each diffusion-saccharificator consists of a tank or vat of wood, copper, or enameled sheet or cast iron, provided with a false bottom B, of wood or metal, perforated and covered with wire-gauze, with a man-hole C above the false bottom, through which to empty out the pulp, and a metallic or wooden case or sieve D at the top, designed to spread or diffuse the stream of boiling liquid which is discharged at the top of the saccharificator. Each heating-elevator K consists of an outer vessel of brass, copper, lead, enameled iron, or other material, inclosing within it a cylindro-conical bell R, Fig. 3, within which bell is placed a serpentine or steam-coil S, designed to heat the saccharifying-liquid. The bell R is fixed at its top to the outer case and descends to within a short distance of the bottom and at its top communicates with the tube L, which conducts the boiling liquid up to the case D at the top of the saccharificator.

The heating-elevator is provided with pipe-connections as follows:

First. It is connected with the bottom of the saccharificator A by means of a pipe E, with which it communicates through a valve or cock H. The pipe E is provided with a check-valve G, adapted to prevent any back-flow of liquid toward the saccharificator.

Second. It is connected with a reservoir containing water for use in the diffusion process by means of a pipe Q, with which it communicates through a valve or cock M. The end of the pipe Q extends down to the water-reservoir, a portion of which is shown at Q' in Fig. 1.

Third. It is connected with the bottom of the preceding saccharificator by means of the pipe E, before mentioned, and the pipe E', with which latter it communicates through a valve or cock N. This latter connection is employed only in the case of a battery or succession of saccharificators.

Fourth. It is connected with the top of the saccharificator by means of an escape-pipe O for facilitating the escape of air from the annular chamber V, formed within the heater around the bell R. The coil or serpentine S receives steam through a pipe T, and the water of condensation is drawn off through a pipe U.

The saccharification is effected in the following manner: The diffusion-saccharificator, being charged with vegetable matter and with acidulated water, is put in communication by means of the pipe E and the cock H with its heating-elevator K. Steam is introduced into the serpentine S. The liquid which fills the heater and envelopes the serpentine is thereby heated to ebullition and by the formation of steam is caused to flow up through the tube L to the top of the saccharificator and into the case D thereof, which breaks the impact of the stream and distributes it uniformly over the surface of the vegetable mass. By this upflow from the heater a partial vacuum is produced in the empty annular space V, which in turn becomes filled with liquid flowing by its own weight from the saccharificator. This double movement continues and establishes a circulation, the boiling liquid flowing thus slowly through the entire vegetable mass, heating it by its contact therewith and effecting its saccharification. This circulatory movement is arrested at the moment when the desired degree of saccharification is attained. The cock H is then closed and the emptying valve or cock F in a branch from the pipe E is opened in order to run off the sirup, which is replaced by a corresponding quantity of water entering the heating-elevator K by the cock M and being forced up through the tube L to the top of the vegetable mass in the saccharificator. This rinsing with pure hot water is continued until the sirup comes off at the minimum density, which is recognized by means of the areometer.

In the case of a battery of saccharificators, as is shown in the drawings, instead of immediately replacing the sirup by water a communication is established by means of the valve N and the pipe E' with the preceding apparatus, the sirup from which is of insufficient density, so that the circulation becomes continuous through the successive vessels. The circulation of the sirup is not interrupted and the rinsing with water commenced until the diffusion in the first saccharificator reaches totality, or, in other words, until the density of the liquid percolating therethrough ceases to be materially increased. The saccharificators at the opposite ends of the series are connected to one another through the medium of the pipe P, so that all of the saccharificators are connected in a continuous diffusion-circuit.

In the drawings the full-line arrows indicate the flow of the liquid during the process of saccharification and the dotted arrows indicate the flow of the liquid during the diffusion and the drawing off of the sirup at the maximum concentration through the cock F.

When the vegetable matter in a saccharificator becomes entirely spent, the rinsing-water is drawn off through the cock F and conducted outside of the factory, after which the spent pulp is emptied out through the manhole C. At the completion of the operation this pulp may be put into silos as feed. It has preserved integrally the form of the original matter and contains all or nearly all of the nitrogenous matters, the starch alone being entirely replaced by water. If the saccharification of the juice has not arrived at the desired degree, it is finished either in ordinary cleaning-vessels having heating-coils or in digesters. The desired saccharification being obtained, the acid is saturated and the clear sirup is sent for fermentation in the distillery or submitted in glucose-making to the same treatment as that obtained by the ordinary process after having eliminated the nitrogenous matters dissolved by the known reagents.

I make no claim in this application to the process of saccharification, that having been claimed in my application, Serial No. 269,527, filed April 4, 1888, of which my present application is a division.

I claim as my invention the following defined improvements in apparatus for the saccharification of amylaceous or isomeric matters, substantially as hereinabove specified, viz:

The combination, with a diffusion saccharificating-vessel and its circulating pipes, of a heating-elevator consisting of an outer casing, a bell within said casing communicating at its upper end with the delivery-pipe, a steam-coil within said bell, and inlet-pipes communicating with the annular chamber around said bell.

In witness whereof I have hereunto signed my name in the presence of two subscribing witnesses.

VICTOR CAMILLE AUGUSTE
MARCEL BONDONNEAU.

Witnesses:
G. MÉTON,
R. J. PRESTON.